United States Patent Office 3,492,280
Patented Jan. 27, 1970

3,492,280
THREE COMPONENT ALKYL ALUMINUM HALIDE CATALYST FOR POLYMERIZATION OF ETHYLENICALLY UNSATURATED COMPOUNDS CONTAINING AS A THIRD CATALYST COMPONENT SUBSTITUTED ALKALINE EARTH AMIDES
Frederick B. Joyner and George O. Cash, Jr., Kingsport, Tenn., assignors to Eastman Kodak Company, Rochester, N.Y., a corporation of New Jersey
No Drawing. Continuation of application Ser. No. 579,789, Sept. 15, 1966. This application Nov. 29, 1967, Ser. No. 687,912
Int. Cl. C08f 1/42, 1/56
U.S. Cl. 260—93.7    6 Claims

ABSTRACT OF THE DISCLOSURE

Process for polymerizing alpha-monoolefins to solid crystalline polymers employing as a catalyst a mixture of (1) an alkyl aluminum dihalide, (2) a compound of a metal selected from the group consisting of titanium, zirconium, vanadium, chromium, and molybdenum, and (3) a component having the formula $M(NZ_2)n$ where M is a member selected from the group consisting of alkaline earth metals, $n$ is a positive integer equal to the valence of M, and Z is a member selected from the group consisting of alkyl, aryl and aralkyl.

This application is a continuation of application Ser. No. 460,584, filed June 1, 1965, now abandoned, and application Ser. No. 579,789, filed Sept. 15, 1966, now abandoned.

This invention relates to a new and improved polymerization process. One of the aspects of this invention relates to the use of a novel catalyst combination for preparing high molecular weight solid polyolefins, such as polypropylene of high density and crystallinity. Another aspect of this invention concerns the preparation of polypropylene and higher polyolefins using a particular catalyst combination which has unexpected catalytic activity and which gives products characterized by unusually high crystallinity, softening point, thermal stability, stiffness and being substantially free of noncrystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations and the results are ordinarily highly unpredictable since relatively minor changes in the catalyst combination often lead to liquid polymers rather than the desired solid polymers.

Certain of the trialkyl aluminum compounds have been used in conjunction with inorganic halides to give high molecular weight polyethylene. Thus, triethyl aluminum in conjunction with titanium tetrachloride permits a low temperature, low pressure polymerization of ethylene to highly crystalline product. When this catalyst mixture is employed to polymerize propylene, the product is predominantly polymeric oils and rubbers with a comparatively small amount of high molecular weight crystalline products. Furthermore, a mixture of ethyl aluminum halide and titanium trihalide is ineffective as a polymerization catalyst, for example for polymerizing propylene.

Some of the catalysts that are effective for producing crystalline high density polyethylene cannot be used to produce a similar type of polypropylene. Thus, one cannot predict whether a specific catalyst combination will be effective to produce crystalline high density polymers with specific α-olefins.

Accordingly, it is one of the objects of this invention to provide improved processes whereby monoethylenically unsaturated compounds and particularly α-monoolefins such as propylene can be readily polymerized by catalytic means to give high molecular weight, highly crystalline polymers.

Another object of the invention is to provide a catalyst combination which has unexpected catalytic activity for the polymerization of monoethylenically unsaturated compounds to form polymers.

A further object of the present invention is to provide a catalyst combination for polymerizing monoethylenically unsaturated compounds to form crystalline high density polymers.

Still another object of this invention is to provide a three-component catalyst for polymerizing monoethylenically unsaturated compounds.

Further objects of this invention will become apparent from an examination of the following description and claims.

In accordance with this invention, it has been found that monoethylenically unsaturated compounds, either singly or in admixture, are readily polymerized to high molecular weight solid polymers by effecting the polymerization in the presence of a catalytic mixture containing an aluminum dihalide having the formula $R_1Al-X_2$ wherein $R_1$ is a hydrocarbon radical containing 1 to 12 carbon atoms and selected from the group consisting of alkyl, aryl and aralkyl and X is a halide selected from the group consisting of chlorine, bromine and iodine, a compound of a transition metal selected from the group consisting of titanium, zirconium, vanadium, chrominum and molybdenum, said compound being selected from the group consisting of halides, alkoxyhalides and acetylacetonates, and a third component selected from the compounds having the formula: $N(NZ_2)n$ wherein M is lithium, sodium, potassium, cesium, rubidium, beryllium, magnesium, calcium, barium or strontium, and $n$ is 1 or 2 according to the valence of M, and Z is an alkyl, aryl, or aralkyl group containing 1–12 carbon atoms. The catalytic activity of this mixture was wholly unexpected, particularly since the alkyl aluminum dihalides either singly or in admixture with the aforementioned metal compounds are ineffective as polymerization catalysts. Also, the third component of this catalyst composition is not an effective polymerization catalyst. The inventive process is carried out in liquid phase in an inert organic liquid and preferably an inert liquid hydrocarbon vehicle, but the process can be carried out in the absence of inert diluent. The process proceeds within excellent results over a temperature range of from 0° C. to 250° C., although it is preferred to operate within the range of from about 40° C. to about 150° C. Likewise, the reaction pressures may be varied widely from about atmospheric pressure to very high pressures of the order of 20,000 p.s.i. or higher. A particular advantage of the invention is that pressures of the order of 3–1000 p.s.i. give excellent results, and it is not necessary to employ the extremely high pressures which were necessary heretofore which required a costly expenditure for high pressure equipment. The liquid vehicle employed is desirably one which serves both as a liquid reaction medium and as a solvent for the solid polymerization products at the temperature of polymerization.

The invention is of particular importance in the preparation of highly crystalline homopolymers such as polyethylene, polypropylene, the polybutenes and polystyrene or copolymers such as a mixture of ethylene and propylene as well as other monoethylenically unsaturated compounds containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting medium.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indexes as measured by the standard ASTM method may be varied from about 0.1 to 100 or even higher.

The novel catalysts described above are particularly useful for polymerizing propylene to form a crystalline, high-density polymer. The polyproplene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

As has been indicated above the improved results obtained in accordance with this invention depend upon the particular catalyst combination. Thus, one of the components of the catalyst is a compound of aluminum dihalide having the formula $R_1AlX_2$ wherein $R_1$ is a hydrocarbon radical containing 1–12 carbon atoms and selected from the group consisting of alkyl, aryl and aralkyl. Among these hydrocarbon radicals are methyl, ethyl, propyl, butyl, phenyl, phenylethyl, naphthyl and the like, and X is a halogen selected from the group consisting of chlorine, bromine and iodine. The preferred alkyl aluminum dihalides are the lower alkyl derivatives, and the most preferred is ethyl aluminum dichloride. Another component of the catalyst composition is a compound of a transition metal selected from the group consisting of titanium, zirconium, vanadium, chromium, and molybdenum. In these compounds the transition metal can be at its maximum valence but it is possible to employ a compound of a transition metal having a reduced valence.

Among the transition metal compounds that can be used are the halides, alkoxyhalides and acetylacetonates of the above-named transition metals. Such compounds as titanium tetrachloride, titanium trichloride, dibutoxy titanium dichloride, diethoxy titanium dichloride, and titanium acetylacetonate can be used in the catalyst combination. Similar compounds of zirconium, vanadium, chromium, and molybdenum can also be used. For the most desirable results it is preferred to use a halide of titanium having either its maximum valency or a reduced valency and specifically it is preferred to employ violet titanium trichloride, including titanium trichloride complexed with aluminum chloride, as for example 3 $TiCl_3$, $AlCl_3$. The violet titanium trichloride may be used in a highly crystalline form, or it may be ground, such as by a ball mill, until it is in such fine form that it appears to be substantially amorphous by X-ray diffraction. This fine divided form of titanium trichloride has been referred to in the art as amorphous titanium trichloride.

The third component of the catalyst composition is a compound having the formula: $M(NZ_2)n$ wherein M is lithium, sodium, potassium, cesium, rubidium, beryllium, magnesium, calcium, barium or strontium, and $n$ is 1 or 2 according to the valence of M, and Z is an alkyl, aryl, or aralkyl group containing 1–12 carbon atoms. Among the specific compounds that can be used are sodium di-n-butyl-amide, sodium diethylamide, potassium dipropyl-amide, lithium dimethylamide, sodium N-methyl-N-ethylamide, sodium N-methyl-N-phenylamide, potassium N-ethyl-N-butylamide, calcium N-methyl-N-isobutylamide, strontium N-methyl-N-amylamide, sodium N-ethyl-N-dodecylamide, potassium didecylamide, sodium diphenylamide, sodium di-p-tolylamide, potassium N-methyl-N-benzylamide, barium N-methyl-N-cyclohexylamide, sodium N-ethyl-N-phenylamide sodium N-methyl-N-p-tolylamide and the like.

The limiting factor in the temperature of the process appears to be the decomposition temperature of the catalyst. Ordinarily temperatures from 50° C. to 150° C. are employed, although temperatures as low as 0° C. or as high as 250° C. can be employed if desired. Usually, it is not desirable or economical to effect the polymerization at temperatures below 0° C. and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization, and is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 100 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example up to 40% and higher are preferred. Higher concentrations of monomer ordinarily increase the rate of polymerization, but concentrations about 5–10% by weight in a solution process are ordinarily less desirable because the polymer dissolved in the reaction medium results in a very viscous solution.

The preferred molar ratio of aluminum compound to the metal amide can be varied within the range of 0.3:1 to about 5:1, preferably about 1:1 to 1:0.25, while the ratio of aluminum compound to the transitional element component of the catalytic mixture can be varied within the range of 0.2:1 to about 10:1, preferably about 1:0.5 to 1:2. A particularly effective catalyst contains one mole of transition metal compound and 0.5 to 0.25 mole of the third component per mole of aluminum dihalide. The polymerization time can be varied as desired and will usually be of the order of from 30 minutes to several hours in batch processes. Contact times of from 1 to 4 hours are commonly employed in autoclave type reactions. When a continuous process is employed the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene. The nature of the vehicle is subject to considerable variation, although the vehicle employed should be liquid under the conditions of reaction and relatively inert. The hydrocarbon liquids are desirably employed. Other solvents which can be used include ethyl, benzene, isopropyl benzene, ethyl toluene, n-propyl benzene, diethyl benzene, mono and dialkyl naphthalenes, n-pentane, n-octane, isooctane, methyl cyclohexane, tetralin, decalin, and any of the other well-known inert liquid hydrocarbons. The diluents employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with a polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing ethylene, propylene, styrene and other α-monoolefins in accordance with this invention is a mixture of ethyl aluminum dichloride, titanium trichloride and sodium amide. The importance of the various components of this reaction mixture is evident from the fact that a mixture of ethylaluminum dichloride and titanium trichloride is ineffective for polymerizing propylene. However, when the above sodium amide or other third component within the scope of this invention is added to the mixture the resulting catalyst composition is highly effective for polymerizing propylene to form a highly crystalline, high-density, high-softening polymer.

The invention is illustrated by the following examples of certain preferred embodiments thereof:

EXAMPLE 1

Inside a nitrogen-swept drybox, to a clean, dry, stainless steel autoclave (310 ml. capacity) was added 0.82 g. ethylaluminum dichloride, 0.13 g. sodamide, and 1.04 g. $TiCl_3$. The autoclave was removed from the drybox and charged with 200 ml. of liquid propylene, then attached to a rocking mechanism which was equipped with a heater. The autoclave was heated to 85° C. and rocked for four hours, then cooled to room temperature and vented. The catalyst was destroyed with methanol, and the polymer was washed three times with boiling methanol. The yield of clean dry polypropylene was 37.6 g. The polymer had an inherent viscosity (I.V.) in tetralin at 145° C. of 2.8. Extraction of 10 g. of the polymer with heptane left a crystalline, heptane-insoluble residue of 8.9 or 89%.

EXAMPLE 2

The procedure of Example 1 was followed, except that the sodamide was omitted. No solid crystalline polymer was obtained.

EXAMPLE 3

The procedure of Example 1 was followed, but the catalyst was composed of 0.37 g. of ethylaluminum dichloride, 0.12 g. of potassium amide, and 0.52 g. of titanium trichloride. The yield of polypropylene (92% heptane-insoluble) was 81.4 g. The inherent viscosity was 2.3. Similar results were obtained when the potassium amide was replaced by 0.32 of cesium amide.

EXAMPLE 4

The procedure of Example 1 was followed, except that the catalyst was 1.45 g. of n-butylaluminum diiodide, 0.17 g. of potassium, amide and 0.38 g. of titanium trichloride. Instead of propylene, 200 ml. of 1-butene was the monomer. The yield of highly crystalline poly(1-butene) was 87.4 g. The inherent viscosity of this polymer was 3.1. Similar results were obtained when lithium amide was used instead of potassium amide.

EXAMPLE 5

A 500 ml. pressure bottle was charged with 100 ml. dry n-heptane, 1.23 g. of n-propylaluminum dibromide, 0.15 g. of magnesium amide, and 0.62 g. of zirconium tetrachloride. The bottle was attached to a shaking mechanism and connected to a reservoir of dry ethylene which was maintained at a pressure of 40 p.s.i. The bottle was heated to 70° C. and shaken for 6 hrs. under 40 p.s.i. ethylene pressure. The steady buildup of polymer could be observed. The bottle was cooled, and the polymer was washed three times with methanol. The yield of dry polymer which had an I.V. of 2.5 was 52 g. Similar results were obtained when chromyl chloride or molybdenum pentachloride were used instead of zirconium tetrachloride.

EXAMPLE 6

Inside the nitrogen-swept drybox, a clean, dry beverage bottle was charged with 0.79 g. of ethylaluminum dichloride, 0.11 g. of calcium amide, 1.10 g. of titanium trichloride and 100 ml. of 4-methyl-1-pentene. The bottle was capped with a Teflon-lined crown cap and immersed in a water bath at 80° C., where it was agitated for four hours. The polymer was washed as described in previous examples. The yield of highly crystalline poly(4-methyl-1-butene) was 61 g. Similar results were obtained using 3-methyl-1-butene as the monomer and using a strontium amide instead of calcium amide in the catalyst.

EXAMPLE 7

The procedure of Example 6 was followed but vinyl cyclohexane was used as the monomer and the catalyst was 0.83 g. of ethylaluminum dichloride, 0.14 g. of beryllium amide, and 1.03 g. of vanadium trichloride. The reaction was allowed to run 24 hours. The yield of highly crystalline poly(vinylcyclohexane) was 41. g.

EXAMPLE 8

The procedure of Example 6 was followed, except that styrene was the monomer and the catalyst was 0.51 g. of ethylaluminum dichloride, 0.22 g. of magnesium amide, and 1.26 g. of vanadium trichloride. The yield of highly crystalline polymer (M.P. 240° C.) was 67 g. (Note that this is not the amorphous type of polymer that can be made from styrene with ethylaluminum dichloride alone.)

EXAMPLE 9

The procedure of Example 6 was followed, but the monomer was 1-hexene, and the catalyst was 0.65 g. of ethylaluminum dichloride 0.13 g. of potassium amide, and 1.22 g. of titanium trichloride. The yield of stereoregular poly(1-hexene) was 47 g. The I.V. of this polymer was 3.2.

EXAMPLE 10

The procedure of Example 1 was followed, except that 0.55 g. of sodium N-phenyl-N-ethylamide is used instead of the sodamide of Example 1. The yield of highly crystalline polypropylene was 41 g. Also, similar results are obtained using 0.4 g. of potassium N-propyl-N-butylamide in place of sodamide.

EXAMPLE 11

The procedure of Example 1 was followed, except that after the propylene was charged, a pressure of ethylene 50 p.s.i. above the autogenous propylene pressure was maintained. After four hours a yield of 46 g. of a copolymer containing 83% propylene and 17% ethylene was obtained. This copolymer was highly crystalline and melted at 147° C.

EXAMPLE 12

The procedure of Example 1 was followed, but the monomer was a mixture of 150 ml. of liquid propylene and 50 ml. of liquid 1-butene. The catalyst was composed of 0.67 g. of ethylaluminum dichloride, 0.39 g. of sodium di-n-butylamide, and 0.94 g. of titanium tetrachloride with aluminum. A yield of 84 g. of a copolymer containing 82% propylene and 18% 1-butene was obtained.

Thus, by means of this invention polyolefins such as polyethylene and polypropylene are readily produced using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with anti-oxidants, stabilizers, plasticizers, fillers, pigments and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst not suggested in prior art polymerization procedures, is employed. As a result of the use of this novel catalyst it is possible to produce polymeric hydrocarbons, particularly polypropylene prepared in the presence of catalyst combination within the scope of this invention is substantially free of rubbery and oily polymers and thus it is not necessary to subject such polypropylene of this invention to extraction procedures in order to obtain a commercial product. Also, polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with this olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of $\alpha$-monoolefins. These catalyst compositions can, however, be used for polymerizing other $\alpha$-olefins, and is not necessary to limit the process of the invention to monoolefins. Other $\alpha$-olefins that can be used are butadiene, isoprene, 1,3-pentadiene and the like.

Although the invention has been described in considerable detail with reference to certain preferred embodiments thereof, variations and modifications can be effected within the spirit and scope of the invention as described hereinabove as defined in the appended claims.

We claim:
1. In in the polymerization of alpha olefins having at least 3 carbon atoms to form solid crystalline polymers, the improvement which comprises catalyzing the polymerization with a mixture comprising (1) an alkyl aluminum dihalide having the formula $RAlCl_2$ wherein R is an alkyl group containing 1–12 carbon atoms, (2) a halide, alkoxyhalide or acetylacetonate of a metal selected from the group consisting of titanium, zirconium, vanadium, chromium and molybdenium and (3) a component having the formula $M(NZ_2)n$ where M is a member selected from the group consisting alkaline earth metals, $n$ is a positive integer equal to the valance of M, and Z is a 1–12 carbon containing member selected from the group consisting of alkyl, aryl and aralkyl.

2. In the polymerization of alpha-olefins having at least 3 carbon atoms to form solid crystalline polymers as in claim 1 wherein (2) is titanium trichloride.

3. The process of claim 2 wherein the mol ratio of alkyl aluminum dihalide to titanium trichloride is from about 0.2:1 to about 10:1 and the mol ratio of alkyl aluminum dihalide to the component (3) is from about 0.3:1 to about 5:1.

4. In the polymerization of alpha olefins having at least 3 carbon atoms to form solid crystalline polymers as in claim 2, the improvement which comprises catalyzing the polymerization with a mixture comprising an alkyl aluminum dihalide, titanium trichloride and magnesium diethylamide.

5. In the polymerization of alpha olefins having at least 3 carbon atoms to form solid crystalline polymers as in claim 2, the improvement which comprises catalyzing the polymerization with a mixture comprising an alkyl aluminum dihalide, titanium trichloride and calcium diethylamide.

6. The process according to claim 4 wherein said alpha olefin is propylene.

References Cited

UNITED STATES PATENTS 3,147,240  9/1964  Coover et al. _____ 260—93.7
3,113,165  12/1963  Block _____ 260—683.15

FOREIGN PATENTS 937,592  9/1963  Great Britain.

JOSEPH L. SCHOFER, Primary Examiner

E. J. SMITH, Assistant Examiner

U.S. Cl. X.R.

252—429; 260—882, 931, 935, 943, 949